UNITED STATES PATENT OFFICE.

THORVALD MÖLLER, OF ESBJERG, DENMARK.

EDIBLE FATTY COMPOUND AND PROCESS OF MAKING THE SAME.

1,004,891.      Specification of Letters Patent.      Patented Oct. 3, 1911.

No Drawing.     Application filed February 12, 1910. Serial No. 543,491.

*To all whom it may concern:*

Be it known that I, THORVALD MÖLLER, a citizen of the Kingdom of Denmark, residing in Esbjerg, in said Kingdom of Denmark, have invented certain new and useful Improvements in Edible Fatty Compounds and Process of Making the Same, of which the following is a specification.

This invention relates to an improved edible fatty compound and process of making the same from animal and vegetable fats in such a manner that the more or less insipid natural taste, or the taste lacking in these fats, is improved and a certain degree of consistency imparted to the same, which rendered the so treated fats better adapted for domestic or household purposes.

The invention consists essentially in adding to the animal or vegetable fats employed, glycerin, an organic acid or a mixture of organic acids.

In carrying out my improved process an animal or vegetable fat, or a mixture of the same, is mixed, on the one hand, with glycerin, and, on the other hand, with an organic acid, or a mixture of organic acids, such as acetic acid, butyric acid, stearic acid, oleic acid, lactic acid, malic acid, tartaric acid, glucocic acid, citric acid, etc.

The proportion between the glycerin and the acid constituents can be in most cases 1 to 2, and the entire quantity of the same in the animal or vegetable fat may be from 1 to 10% of the weight of the same. These proportions, however, can be changed within certain wide limits, according to the more or less distinctive properties of the additional ingredients employed for the purposes referred to. As an utmost limit, in proportion to the quantity of the fatty substance employed, the quantity of glycerin should be not more than 1/10 to 5% and the quantity of the organic acid ½ to 10%. In addition to the substances stated, sugar and salt may be eventually added in proper proportions to improve the taste of the edible fatty compound produced. When desired, the additional substances can be added individually and successively into the fatty substance and thoroughly mixed with the same, or they can be mixed with each other before adding them to the fatty substance and then thoroughly mixed with the same. The product obtained by the mixture of a fat with the additional substances forms an edible fatty compound of greatly improved taste and increased consistency.

A specific example of the carrying out of this process is as follows:—100 parts of nucolin (nut fat) are mixed with a mixture of one part gylcerin and two parts of diluted acetic acid. The product so obtained can be used directly as an edible fatty substance and has the advantage of being capable of indefinite preservation.

I claim:

1. The process herein described of making an edible fatty compound which consists in mixing a fatty substance with a mixture of glycerin and an organic acid.

2. The process herein described of making an edible fatty compound, which consists in mixing a fatty substance with glycerin and a mixture of organic acids.

3. The process herein described of making an edible fatty substance, which consists in mixing nucolin (nut fat) with a mixture of glycerin and diluted acetic acid.

4. The process herein described of making an edible fatty compound, which consists in mixing 100 parts of nucolin (nut fat) with a mixture of one part of glycerin and two parts of diluted acetic acid.

5. An edible fatty compound, comprising a mixture of 100 parts of nucolin (nut fat), one part glycerin and two parts of diluted acetic acid.

In testimony, that I claim the foregoing as my invention, I have signed my name in presence of two subscribing witnesses.

THORVALD MÖLLER.

Witnesses:
   P. HOFMAN BAUG,
   ERNEST BAETORD.